United States Patent Office 3,329,739
Patented July 4, 1967

3,329,739
COATING COMPOSITION COMPRISING AN ALKYD RESIN, AN AMINOPLAST, AND AN ADDUCT OF A HYDROXYL-CONTAINING POLYMER AND AN ANHYDRIDE OF A DI-CARBOXYLIC ACID
Charles V. Semroc, Natrona Heights, Pa., assignor to Pittsburgh Plate Glass Company, Pittsburgh, Pa., a corporation of Pennsylvania
No Drawing. Filed Mar. 30, 1964, Ser. No. 355,925
9 Claims. (Cl. 260—850)

This invention relates to coating compositions based upon alkyd resin-aminoplast resin compositions which are modified to improve their adhesion to metal substrates.

Coating compositions based upon a combination of an alkyd resin and an aminoplast resin are well known and have been widely used to provide hard and attractive coatings on various articles, such as appliances, automobiles, and the like. Being based upon a combination of two different resinous materials, they achieve properties which cannot be attained using either component alone. For this same reason, however, certain of the less desirable properties of the individual components are found in compositions based upon their blends.

One of the properties of alkyd-aminoplast compositions which is thus not entirely satisfactory is the adhesion of such compositions to metal surfaces. Combinations of alkyd resin and aminoplast resin do not adhere to such surfaces to the same extent as compositions based upon alkyd resins alone. In many cases, in order to achieve satisfactory adhesion to metal substrates, pretreatment of the metal is required, as by phosphating or the like, or a primer is necessary. This is especially true in compositions containing substantial proportions of the aminoplast resin, for example, 20 percent to 60 percent by weight based upon the total of the alkyd resin and the aminoplast resin. Compositions containing high proportions of aminoplast resin are particularly desirable in finishes for appliances and similar articles.

It has now been found that the adhesion of alkyd resin-aminoplast resin coating compositions to metal surfaces is greatly improved by the addition of a relatively small amount of an ungelled adduct of a polymer containing free hydroxyl groups and an anhydride of a dicarboxylic acid. Such adducts are formed by reaction of the anhydride with at least some of the free hydroxyl groups in the hydroxyl-containing polymer. The compositions thus produced can be formulated and pigmented in the usual manner employed with alkyd resin-aminoplast resin coating compositions. The heat-convertible coatings made therefrom have all the outstanding properties normally associated with such coating materials and, in addition, provide greatly improved adhesion to metal surfaces. The adhesion is such that in many instances no pretreatment of the metal or primer coating is required, even when substantial proportions of the aminoplast resin are present.

The alkyd resin-aminoplast resin coating compositions to which the instant invention is applicable include those containing various aldehyde condensation products of melamine, urea, and similar compounds. Generally, the aminoplast resins form from about 5 percent to about 60 percent by weight of the total of the alkyd resin and aminoplast resin.

Aminoplast resins produced from melamine or urea are most common and are preferred. However, condensation products of other amines and amides can also be employed, for example, those of triazines, diazines, triazoles, guanidines, guanamines, and alkyl and aryl substituted derivatives of such compounds, including alkyl and aryl substituted ureas, and alkyl and aryl substituted melamines, provided at least one amino group is present. Some examples of such compounds are N,N'-dimethylurea, benzyl urea, dicyandiamide, formoguanamine, acetoguanamine, benzoguanamine, ammeline, 2-chloro-4, 6-diamino-1,3,5-triazine, 6 - methyl-2,4 - diamino - 1,3,5-triazine, 2-phenyl-4-amino-6-hydroxy-1,3,5-triazine, 3,5-diaminotriazole, triaminopyrimidine, 2-mercapto-4,6-diaminopyrimidine, 2,4,6-trihydrazine-1,3,5-triazine, 2,4,6-triethyltriamino-1,3,5-triazine, 2,4,6-triphenyltriamino-1, 3,5-triazine, and the like.

The aldehyde is most often formaldehyde, although similar condensation products can be made from other aldehydes, such as acetaldehyde, crotonaldehyde, acrolein, benzaldehyde, furfural, and others.

These aldehyde condensation products contain methylol or similar alkylol groups, the structure of the alkylol group depending upon the particular aldehyde employed. At least a portion, i.e., all or part, of these alkylol groups may be etherified by reaction with an alcohol to provide organic solvent-soluble coatings. Any monohydric alcohol can be employed for this purpose, including such alcohols as methanol, ethanol, propanol, butanol, pentanol, hexanol, heptanol, and other alkanols, usually having up to about 12 carbon atoms, as well as benzyl alcohol and other aromatic alcohols; cyclic alcohols, such as cyclohexanol; monoethers of glycols, such as the Cellosolves and Carbitols; and halogen-substituted or other substituted alcohols, such as 3-chloropropanol.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

Alkyd resins made from saturated oils or saturated fatty acids are preferred in formulating the compositions of the invention. However, there may be employed any of the saturated or unsaturated alkyd resins utilized in the coatings field, produced from any polybasic acid and polyfunctional alcohol. Thus, for example, the alkyd may be made from such polyfunctional acids as phthalic acid, maleic acid, fumaric acid, isophthalic acid, succinic acid, trimellitic acid, adipic acid, azelaic acid, sebacic acid, linoleic acid, fatty acids, and the like, as well as from anhydrides of such acids. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

The alkyd resin may be oil-modified or non-oil-modified. The oil, when one is utilized, is preferably coconut oil or other saturated oil, although drying or semi-drying oils, such as fish oils, linseed oil, soybean oil or the like, can also be employed. If desired, the alkyd resin can contain a monobasic acid, such as benzoic acid, a substituted benzoic acid, or a similar monobasic aromatic acid. The alkyd can also be a polyester containing adipic acid or a similar acid along with various glycols and/or polyols.

Included within the scope of the term "alkyd resin" as used herein are reaction products of polybasic acids and polyfunctional alcohols as disclosed above, which are copolymerized with one or more other polymerizable ethylenically unsaturated monomers. Such monomers include esters of acrylic acid and methacrylic acid, acrylonitrile, olefinic hydrocarbons, and other such monomers containing a $CH_2=C<$ group.

The present invention relates to blends or mixtures of such alkyd resin-aminoplast resin compositions with an adduct of a hydroxyl-containing polymer and a carboxylic acid anhydride. Any polymeric material containing only a few or many free hydroxyl groups along the polymer chain can be utilized in the formation of such adducts. The following are typical examples of such hydroxyl-containing polymers.

A. Polymers of an unsaturated primary aliphatic alcohol with at least one monomer containing a $CH_2=C<$ group: One particularly useful product of this type is a polymer of allyl alcohol and styrene having the following structure:

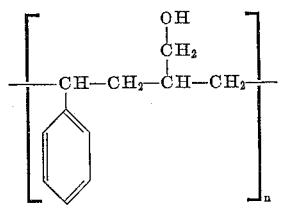

Preferably, the value of $n$ is in the range of about 4 to 10, and several products of this general class are available commercially. In the preparation of such polymers, the allyl alcohol can be replaced by other alcohols containing a polymerizable $CH_2=C<$ group, for example, methallyl alcohol, and the like, with aliphatic unsaturated alcohols containing up to about 10 carbon atoms being particularly useful. The monomeric material which is polymerized with the unsaturated alcohol to form the materials of this class may be selected from the group of polymerizable ethylenically unsaturated monomeric materials set forth hereinabove, with styrene and acrylonitrile being particularly preferred. Another route to this type of polymer is through the hydrogenation of acrolein copolymers.

B. Polyesters prepared by the reaction of polyols with polycarboxylic acids: When polyols such as ethylene glycol, propylene glycol, diethylene glycol, or the like glycols and other polyols containing from about 2 to 12 carbon atoms are reacted, preferably in excess, with a dicarboxylic acid (or anhydride) such as adipic acid, succinic acid, maleic acid, fumaric acid, phthalic acid, isophthalic acid, tetrachlorophthalic acid, or other dicarboxylic acids containing up to about 12 carbon atoms, there is obtained a polyester having free hydroxyl groups attached to the polymer chain. Such polyesters may also be reacted with anhydrides of carboxylic acids to form the adducts utilized in preparing the compositions of this invention.

C. Polyethers prepared, for example, by the reaction of a polyol such as sucrose, sorbitol, glycerol, or the like, containing up to about 10 carbon atoms, with an alkylene oxide such as ethylene oxide, propylene oxide, butylene oxide, or the like, or a mixture of such oxides, can also contain free hydroxyl groups when the polyol component is present in excess. The resulting hydroxyl-containing polyethers may also be reacted with anhydrides and carboxylic acids to form adducts which can be blended with alkyd-aminoplast compositions in accordance with the present invention.

D. Polymers containing recurring vinyl alcohol units of the structure:

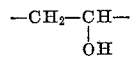

The hydroxyl groups in the polyvinyl alcohol react readily with carboxylic acid anhydrides such as maleic anhydride to form adducts which can be employed herein.

E. Hydroxyl-modified vinyl halide polymers: These polymers are preferably copolymers of a vinyl halide, such as vinyl chloride or vinyl bromide, with a vinyl ester of an aliphatic monocarboxylic acid, such as vinyl acetate, vinyl propionate, vinyl butyrate, or the like, which polymers are modified by having hydroxyl groups introduced into the copolymer chain by hydrolysis of at least a portion of the ester linkages in the copolymer structure. Carboxylic acid anhydrides react with such hydroxyl groups to form adducts useful for blending with alkyl-aminoplast compositions.

F. Epoxide resins: Many of the epoxide resins are reaction products of epihalohydrins, such as epichlorohydrin, with dihydric phenols, such as bis(4-hydroxy-phenyl)-2,2-propane. Some of these materials possess hydroxyl groups along the epoxide polymer structure. These hydroxyl groups may also be reacted with carboxylic acid anhydrides to form adducts; however, care must be taken in the reaction to prevent curing of the epoxide resin by the anhydride.

While the above classes of polymers are representative of those which may be employed in forming the compositions of this invention, they by no means represent all of the hydroxy-containing materials which may be used. For example, it is possible to utilize silicon-containing polymers which possess free hydroxyl groups Any dicarboxylic acid anhydride may be reacted with the hydroxyl-containing polymer to form the adducts uitlized. Maleic anhydride is particularly preferred because of its low cost and ready availability; however, other anhydrides, such as itaconic anhydried, succinic anhydride, adipic anhydride, and other saturated and unsaturated dicarboxylic anhydrides, containing up to about 12 carbon atoms may be used with good results.

In preparing adducts of the free hydroxyl-containing polymers with the dicarboxylic acid anhydrides care should be taken so as to prevent substantial esterification beyond the opening of the anhydride ring. Unless reaction of the carboxyl groups with the hydroxyl groups is minimized, gelation will take place because of the poly-functional nature of the reactants. In order to prevent this gelation, therefore, the temperature of the reaction should be kept as low as possible, for example, below about 100° C.

One preferred method of carrying out the adduct formation involves admixing the hydroxyl-containing polymer and the dicarboxylic acid anhydride in a solvent and refluxing the resulting solution for a period sufficient to form the desired adduct, ordinarily 5 to 10 hours. While useful products can be obtained when all of the free hydroxyls of the polymer are reacted with the dicarboxylic acid anhydrides, the reaction is preferably carried to a stage where about 20 percent to 80 percent of such hydroxyls are reacted, and it is particularly preferred that the adduct contains about 40 percent to 60 percent of the hydroxyls in unreacted form. The acid number of the adduct solids should ordinarily be in the range of about 20 to 200 and the hydroxyl value in a range of about 40 to 200.

Set forth below are several illustrative examples of the preparation of adducts of dicarboxylic acid anhydrides with free hydroxyl-containing polymeric materials.

*Example A*

The following materials were charged into a glass reactor equipped with stirrer, condenser and temperature measuring means:

| | Parts by wt. |
|---|---|
| Allyl alcohol-styrene copolymer (Shell X–450), OH equivalent per 100 grams, 0.45; hydroxyl groups per mole, 5.2 | 85.3 |
| Maleic anhydride | 14.7 |
| Methyl ethyl ketone | 33.3 |

The above components were refluxed until the product had an acid value of 60–64 (about 4 to 8 hours). The product was then diluted to 50 percent solids with toluene, the resulting resinous product having the following analysis:

| | |
|---|---|
| Solids (percent) | 50 |
| Hydroxyl value | 65.0 |
| Acid value | 42.0 |
| Viscosity (Gardner-Holdt) | E–F |

Example B

Example A was repeated, substituting succinic anhydride for the maleic anhydride of the example. The reaction was carried out in such a way as to react the succinic anhydride with about 40 percent of the available hydroxyl groups of the allyl alcohol-styrene copolymer. The resulting product had a Gardner-Holdt viscosity of W and an acid value of 41.0.

Example C

In this example, maleic anhydride was reacted with a polyether obtained by the reaction of sucrose with ethylene oxide in an amount such that the maleic anhydride reacted with 40 percent of the available hydroxyl content of the polyether. The polyether utilized had the following properties:

| | |
|---|---|
| Hydroxyl value | 461 |
| Percent solids | 99.1 |
| Percent water | 0.115 |
| Ash content, parts/million | 159 |
| Viscosity, centipoises | 27,500 |

The reaction was carried out in methyl ethyl ketone, the reaction mixture being refluxed for approximately 4 hours, at which time the acid value of the product was 79.5 at a 50 percent solids content. The Gardner-Holdt viscosity was A−, and the hydroxyl value was 110.4.

Example D

Example A was repeated, substituting for the styrene-allyl alcohol copolymer therein utilized a styrene-allyl alcohol copolymer having an equivalent weight in the range of 284–314 and a hydroxyl content of 5.4 percent to 6.0 percent. The reaction was carried out so as to react about 40 percent of the hydroxyl groups of the polyol with maleic anhydride. The product had an acid value of 35.2 at 51.8 percent solids, with a Gardner-Holdt viscosity of W and a hydroxyl value of 45.2

Example E

One hundred (100) parts by weight of an interpolymer containing 19 percent allyl alcohol, 48.5 percent styrene, and 32.5 percent acrylonitrile was refluxed with 13 parts by weight of maleic anhydride in 114 parts by weight of methyl ethyl ketone. The reflux was carried out for approximately 5 hours, the resulting product having an acid value of 59.4 at a 50 percent solids content, and a Gardner-Holdt viscosity of N–O.

Example F

A polyglycol (Dow 11–100, a propylene oxide condensate of glycerine having an average molecular weight of 1030) was heated in methyl ethyl ketone at reflux with maleic anhydride. The reaction was carried out such that about 50 percent of the available hydroxyl groups in the polyol were reacted with the maleic anhydride. The resulting product had a Gardner-Holdt viscosity of A, an acid value of 45.9, and a hydroxyl value of 95.

This example was repeated using a polyglycol (Dow 11–300) having a molecular weight of about 4000. When diluted to a solids content of 50.9 percent solids with toluene, the product had a Gardner-Holdt viscosity of A, an acid value of 12.48, and a hydroxyl value of 23.85.

Example G

Maleic anhydride was reacted with a polyester prepared by the reaction of 2 moles of adipic acid, 1 mole of diethylene glycol and 2.2 moles of trimethylolpropane. This polyester had an acid value of 1.5 and a hydroxyl value in the range of 350–400. The polyester was dissolved in methyl ethyl ketone and enough maleic anhydride added to react with about 40 percent of the hydroxyl groups of the polyester. The mixture was refluxed until the resulting adduct had an acid value of 97.8 at 73.6 percent solids and a Gardner-Holdt viscosity of O.

The coating compositions of this invention are prepared by mixing the foregoing resinous components along with suitable solvents, such as xylene, toluene, butanol, acetone, and the like, and, if desired, pigments or other coloring agents. In many instances, several alkyd resins and several aminoplast resins are included. The adduct of the anhydride and hydroxyl-containing polymer can be added at any time and need only be thoroughly blended with the other components. The coating compositions are applied by conventional techniques, such as brushing, rolling or spraying, and are then baked to provide a hard, glossy, adherent coating. Typical baking schedules are from about 20 to 60 minutes at 225° F. to 350° F.

The proportion of adduct employed can be varied widely and significant improvement in adhesion is obtained using as little as 1 percent by weight or even less based upon the total nonvolatile resin solids content of the composition. The maximum amount depends upon the particular alkyd resin and aminoplast resin employed, and the use to which the coating composition is to be put. As much as 25 percent by weight or more can be used in some cases, but generally, it is preferable to employ no more than about 10 percent since additional improvement using higher amounts are not great and film properties are sometimes adversely affected thereby.

Alternatively, the adduct and the alkyd-aminoplast composition can be applied separately to the metal surface. This is accomplished by applying the adduct to the metal surface and then applying a layer of the alkyd resin-aminoplast resin composition. Baking is then carried out as above. When coating the surface in this manner, it has been found that optimum proportions of the adduct are applied by dipping the metal surface into a dilute solution of the adduct in a siutable solvent, such as that in which it is prepared. The solution preferably contains from about 2 percent to about 15 percent by weight of the adduct. Although not always necessary, the treated surface is usually air dried for a time sufficient to evaporate the solvent prior to the application of the alkyd resin-aminoplast resin composition.

It is considered that the application of the adduct in this manner, while in the nature of a pretreatment for the metal surface, actually results in a blending of an adduct with the alkyd resin-aminoplast resin composition which is further carried out during the baking of the finished coating. The results achieved by the use of this method of applying the various components are comparable to those attained from compositions in which the adduct is blended with the composition prior to application to the metal.

A typical alkyd resin-aminoplast resin enamel employed to demonstrate the instant invention is produced as follows:

A pigment paste is prepared by grinding together 259 parts of titanium dioxide, 40 parts of xylene, 11 parts of pine oil, and 26 parts of an alkyd resin (50 percent nonvolatile resin solids) made from 198 parts of coconut fatty acid, 139 parts of glycerol, and 219 parts of phthalic anhydride. This paste is reduced with an additional 37 parts of the alkyd resin, 4 parts of xylene, and 68 parts of butylated urea-formaldehyde resin (50 percent solids) made from 1.0 mole of urea, 2.2 moles of formaldehyde, and 1.73 moles of butanol. In formulating the enamel, the foregoing pigment composition is employed along with the above urea-formaldehyde resin, a butylated melamine-formaldehyde made from 1.0 mole of melamine, 6.0 moles of formaldehyde, and 4.3 moles of butanol, and a second alkyd resin made from 110 parts of coconut fatty acid, 106 parts of glycerol, 54 parts of para-tertiary butyl benzoic acid, and 192 parts of phthalic anhydride, as follows:

| | Parts by wt. |
|---|---|
| Pigment composition | 445 |
| Urea-formaldehyde resin (50 percent solids) | 90 |
| Melamine-formaldehyde resin (60 percent solids) | 90 |
| Alkyd resin (65 percent solids) | 280 |
| Amyl phenol | 2 |
| Pine oil | 20 |
| Butanol | 35 |
| Naphtha | 43 |
| Triethylamine | 5 |

In the above enamel, the aminoplast resins form about 40 percent of the total of the alkyd resin and aminoplast resin product.

The invention was demonstrated by tests such as one in which 100 parts of the above enamel were blended with 3.5 parts of the product of Example A above. The mixture was then coated on an untreated steel panel and baked for 30 minutes at 250° F. For comparative purposes, a second panel was coated with the same enamel, but without the adduct being added, and similarly baked. Both panels were then subjected to several tests, including the conical mandrel flexibility test, ASTM D-522-41, and an impact resistance test using a Gardner variable impact tester. Both these tests are measures of the adhesion of a coating to the substrate and indicate properties which are essential to usable protective coatings.

In other tests, the adduct was applied to the panel prior to the application of the enamel. For example, there was made up a 5 percent solution of the adduct of Example A above in a solvent mixture made up of equal parts of xylene and Cellosolve acetate. An untreated steel panel was immersed in this solution for 60 seconds and dried at room temperature until the solvent had evaporated. There was then applied a layer of the enamel described above and the panel was baked for 30 minutes at 250° F. The panel was then subjected to the same tests mentioned above.

It was found that both the panels containing the adduct of Example A exhibited equivalent properties, and that both were substantially superior in flexibility and impact resistance to the panel containing the alkyd resin-aminoplast resin composition without the adduct.

Similar results are obtained using other adducts of the class described, such as the adducts of Examples B to G, with the enamel described above, as well as with various other combinations of alkyd resins and aminoplast resins.

According to the provisions of the patent statutes, there are described above the invention and what are now considered to be its best embodiments. However, within the scope of the appended claims, it is to be understood that the invention can be practiced otherwise than as specifically described.

I claim:

1. A resinous composition comprising (a) an alkyd resin-aminoplast resin coating composition, and (b) from about 1 percent to about 25 percent by weight, based on the total of (a) and (b), of an ungelled adduct of a polymer containing free hydroxyl groups and an anhydride of a dicarboxylic acid.

2. A resinous composition comprising (a) an alkyd resin-aminoplast resin coating composition in which said aminoplast resin is present in an amount between about 5 percent and about 60 percent by weight based on the total of said alkyd resin and said aminoplast resin, and (b) from about 1 percent to about 10 percent by weight, based on the total of (a) and (b), of an ungelled adduct of a polymer containing free hydroxyl groups and an anhydride of a dicarboxylic acid, said adduct being formed by reaction of said anhydride with at least some of said free hydroxyl groups, said polymer being selected from the group consisting of polymers of an unsaturated aliphatic alcohol, polyesters, polyethers, polymers containing recurring vinyl alcohol units, hydroxyl-modified vinyl halide polymers and epoxide resins.

3. The composition of claim 2 in which the adduct is an adduct of maleic anhydride and a copolymer of an unsaturated aliphatic alcohol with at least one other ethylenically unsaturated monomer.

4. The composition of claim 3 in which the copolymer is a copolymer of allyl alcohol and styrene.

5. A resinous composition comprising (a) an alkyd resin-aminoplast resin coating composition in which said aminoplast resin is an alcohol-modified condensation product of formaldehyde and a member of the group consisting of melamine and urea, and (b) from about 1 percent to about 10 percent by weight, based on the total of (a) and (b), of an ungelled adduct resulting from the reaction of an anhydride of an aliphatic dicarboxylic acid with at least some of the free hydroxyl groups of a free hydroxyl containing polymer, selected from the group consisting of polymers of an unsaturated aliphatic alcohol, polyesters, polyethers, polymers containing recurring vinyl alcohol units, hydroxyl-modified vinyl halide polymers and epoxide resins.

6. The composition of claim 5 in which said aminoplast resin is present in an amount between about 20 percent and about 60 percent by weight, based on the total weight of said alkyd resin and said aminoplast resin.

7. An article comprising a metal surface having thereon an adherent layer of a cured composition comprising (a) an alkyd resin-aminoplast resin coating composition, and (b) from about 1 percent to about 25 percent by weight, based on the total of (a) and (b), of an ungelled adduct of a polymer containing free hydroxyl groups and an anhydride of a dicarboxylic acid.

8. An article comprising a metal surface having thereon an adherent layer of a cured composition comprising (a) an alkyd resin-aminoplast resin coating composition in which said aminoplast resin is present in an amount between about 5 percent and about 60 percent by weight based on the total of said alkyd resin and said aminoplast resin, and (b) from about 1 percent to about 10 percent by weight, based on the total of (a) and (b), of an ungelled adduct of a polymer containing free hydroxyl groups and an anhydride of a dicarboxylic acid, said adduct being formed by reaction of said anhydride with at least some of said free hydroxyl groups, said polymer being selected from the group consisting of polymers of an unsaturated aliphatic alcohol, polyesters, polyethers, polymers containing recurring vinyl alcohol units, hydroxyl-modified vinyl halide polymers and epoxide resins.

9. The article of claim 8 in which said metal surface is untreated steel.

References Cited

UNITED STATES PATENTS

| 2,915,487 | 12/1959 | Shelley | 260—850 |
| 3,230,275 | 1/1966 | Sekmakas | 260—850 |
| 3,245,954 | 4/1966 | Bergman et al. | 260—850 |

MURRAY TILLMAN, *Primary Examiner.*

GEORGE F. LESMES, J. C. BLEUTGE,
*Assistant Examiners.*